(12) United States Patent
Anderson et al.

(10) Patent No.: US 11,787,315 B2
(45) Date of Patent: Oct. 17, 2023

(54) CHILD RESTRAINT BASE AND CHILD RESTRAINT SYSTEM

(71) Applicant: Wonderland Switzerland AG, Steinhausen (CH)

(72) Inventors: Robert S. Anderson, Narvon, PA (US); James M. F. Hutchinson, Mohnton, PA (US); Clyde S. Harmes, V., Mohnton, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/687,203

(22) Filed: Mar. 4, 2022

(65) Prior Publication Data

US 2022/0185153 A1 Jun. 16, 2022

Related U.S. Application Data

(63) Continuation of application No. 17/482,371, filed on Sep. 22, 2021, which is a continuation of application No. 16/565,436, filed on Sep. 9, 2019, now Pat. No. 11,155,187.

(60) Provisional application No. 62/730,314, filed on Sep. 12, 2018.

(51) Int. Cl.
*B60N 2/28* (2006.01)
*B60N 2/26* (2006.01)
*B60N 2/815* (2018.01)

(52) U.S. Cl.
CPC ........... *B60N 2/2821* (2013.01); *B60N 2/265* (2013.01); *B60N 2/2812* (2013.01); *B60N 2/2851* (2013.01); *B60N 2/815* (2018.02); *B60N 2/2806* (2013.01); *B60N 2/2845* (2013.01)

(58) Field of Classification Search
CPC .. B60N 2/2845; B60N 2/2812; B60N 2/2821; B60N 2/265; B60N 2/2806; B60N 2/815
See application file for complete search history.

(56) References Cited

U.S. PATENT DOCUMENTS

| 6,508,510 B2 * | 1/2003 | Yamazaki | B60N 2/2806 |
| | | | 297/250.1 |
| 6,626,493 B2 | 9/2003 | Kain | |
| 6,705,676 B1 | 3/2004 | Berringer et al. | |

(Continued)

FOREIGN PATENT DOCUMENTS

| CN | 101386275 | 3/2009 |
| CN | 201566585 | 9/2010 |

(Continued)

*Primary Examiner* — Milton Nelson, Jr.
(74) *Attorney, Agent, or Firm* — Volpe Koenig

(57) ABSTRACT

A child restraint base adapted to a child restraint carrier is disclosed herein. The child restraint base includes a base body including a first pocket and a second pocket. The first pocket and the second pocket are disposed on front lateral sides of the base body. An anchor belt is included that comprises a first anchor attached to a first end of the anchor belt, and a second anchor attached to a second end of the anchor belt. The first pocket is configured to receive at least a portion of the first anchor, and the second pocket is configured to receive at least a portion of the second anchor. A panel is pivotable between an opened position and a closed position, and the panel pivots to the closed position to tension the anchor belt to remove slack from the anchor belt.

46 Claims, 6 Drawing Sheets

(56) References Cited

U.S. PATENT DOCUMENTS

| | | |
|---|---|---|
| 7,207,628 B2 | 4/2007 | Eros |
| 7,926,874 B2 | 4/2011 | Hendry |
| 7,950,738 B2 | 5/2011 | Shafer |
| 7,988,230 B2 | 8/2011 | Heisey et al. |
| 8,573,695 B2 | 11/2013 | Van Geer et al. |
| 8,845,021 B2 | 9/2014 | Hou et al. |
| 8,973,991 B2 | 3/2015 | Wuerstl |
| 8,979,198 B2 | 3/2015 | Williams et al. |
| 9,315,124 B2 * | 4/2016 | Lehman ............ B60N 2/2821 |
| 9,365,135 B2 * | 6/2016 | Carpenter ........... B60N 2/2803 |
| 9,403,449 B2 | 8/2016 | Longenecker et al. |
| 9,415,707 B2 | 8/2016 | Böhm |
| 10,035,436 B2 | 7/2018 | Zhou et al. |
| 10,189,381 B2 | 1/2019 | Williams et al. |
| 10,406,947 B2 | 9/2019 | Anderson et al. |
| 10,723,245 B2 | 7/2020 | Anderson et al. |
| 2002/0043838 A1 | 4/2002 | Yanaka et al. |
| 2004/0124678 A1 | 7/2004 | Williams et al. |
| 2009/0066131 A1 | 3/2009 | Hendry |
| 2010/0187880 A1 | 7/2010 | Heisey et al. |
| 2011/0140491 A1 * | 6/2011 | Williams ............ B60N 2/2821 |
| | | 297/256.16 |
| 2012/0181829 A1 | 7/2012 | Williams et al. |
| 2013/0026804 A1 | 1/2013 | Guo |
| 2016/0185262 A1 * | 6/2016 | Zhou ............ B60N 2/2821 |
| | | 297/250.1 |
| 2016/0347210 A1 | 12/2016 | Mason et al. |
| 2016/0347212 A1 * | 12/2016 | Mason ............ B60N 2/2821 |
| 2018/0079330 A1 | 3/2018 | Williams et al. |
| 2018/0345827 A1 * | 12/2018 | Anderson ............ B60N 2/2821 |
| 2022/0105836 A1 | 4/2022 | Messner et al. |

FOREIGN PATENT DOCUMENTS

| | | |
|---|---|---|
| CN | 103661024 | 3/2014 |
| CN | 205573677 | 9/2016 |
| CN | 206358032 | 7/2017 |
| CN | 107499195 | 12/2017 |
| EP | 1732782 B1 | 12/2006 |

* cited by examiner

CHILD RESTRAINT BASE AND CHILD RESTRAINT SYSTEM

CROSS REFERENCE TO RELATED APPLICATIONS

This is a continuation application of U.S. patent application Ser. No. 17/482,371, filed on Sep. 22, 2021, which is a continuation application of U.S. patent application Ser. No. 16/565,436, filed on Sep. 9, 2019, now issued U.S. Pat. No. 11,155,187, which claims the benefit of U.S. Provisional Patent Application No. 62/730,314 filed on Sep. 12, 2018, each of which are hereby incorporated by reference in their entirety.

BACKGROUND OF THE INVENTION

The present invention relates to a child product, and more particularly, to a child restraint base and a child restraint system.

A child restraint system is specifically designed to protect a child from injury or death during a collision of a vehicle. A lower anchors and tethers for children (LATCH) system has become a preferred attachment mechanism for installation of the child restraint system with a combined weight of less than 65 lbs. When the combined weight of the child restraint system and the child is more than 65 lbs. or when the vehicle is not compatible with the LATCH system, the child restraint system can be attached on the vehicle by a vehicle belt. However, an anchor belt of the LATCH system must be removed from a path of the vehicle belt and stored properly when it is desired to fix the child restraint system by the vehicle belt. There is a need to provide an improved child restraint system which allows a user or a caregiver to arrange an anchor belt or a vehicle belt easily.

SUMMARY OF THE INVENTION

Therefore, it is an objective of the present invention to provide a child restraint base and a child restraint system with easy operation for solving the aforementioned problem.

In order to achieve the aforementioned objective, the present invention discloses a child restraint base adapted to a child restraint carrier. The child restraint base includes a base body, a first panel component, a second panel component, an anchor belt and a third panel component. The base body is for mounting the child restraint carrier. The first panel component is disposed on the base body. A first through slot is formed between the first panel component and the base body. The second panel component is disposed on the base body and spaced apart from the first panel component. A second through slot is formed between the second panel component and the base body. The anchor belt passes through the first through slot and the second through slot and is slidable between an in-use position and a stored position. The third panel component is disposed between the first panel component and the second panel component and pivotable between an opened position and a closed position. The third panel component pivots to the closed position to tension the anchor belt to remove slack from the anchor belt.

According to an embodiment of the present invention, the child restraint base further includes a first anchor, a second anchor, a first pocket, a second pocket, a first cover and a second cover. The first anchor and the second anchor are connected to the anchor belt. The first pocket and the second pocket are located on an outer perimeter of the base body. The first pocket is for receiving the first anchor and has a first top opening. The second pocket is for receiving the second anchor and has a second top opening. The first cover covers the first top opening, and the second cover covers the second top opening.

According to an embodiment of the present invention, a first inner protruding rib protrudes from the first panel component downwardly. A second inner protruding rib protrudes from the second panel component downwardly, and the first inner protruding rib and the second inner protruding rib guide the anchor belt downwardly and away from the third panel component when the anchor belt moves toward the stored position.

According to an embodiment of the present invention, a first step-shaped structure and a second step-shaped structure are formed on the base body. A protruding length of a lower portion of the first step-shaped structure is less than a protruding length of an upper portion of the first step-shaped structure. A protruding length of a lower portion of the second step-shaped structure is lower than a protruding length of an upper portion of the second step-shaped structure. The first step-shaped structure and the second step-shaped structure are respectively covered by the first panel component and the second panel component. The first inner protruding rib is located at a position corresponding to the lower portion of the first step-shaped structure. The second inner protruding rib is located at a position corresponding to the lower portion of the second step-shaped structure. The first through slot is formed between the first step-shaped structure and the first panel component, and the second through slot is formed between the second step-shaped structure and the second panel component.

According to an embodiment of the present invention, a recess is formed on the base body for receiving the third panel component when the third panel component is located at the closed position, and the third panel component drives the anchor belt to partially enter into the recess to tension the anchor belt for removing the slack from the anchor belt when the third panel component pivots toward the closed position.

According to an embodiment of the present invention, the child restraint base further includes a first engaging component and a second engaging component. The first engaging component is disposed on the third panel component. The second engaging component is disposed on the base body, and the first engaging component engages with the second engaging component for preventing the third panel component from leaving from the closed position when the third panel component is located at the closed position.

According to an embodiment of the present invention, the child restraint base further includes a resilient component installed between the third panel component and the base body for biasing the third panel component to move toward the opened position.

According to an embodiment of the present invention, a first passage and a second passage are formed on two lateral sides of the base body, and the anchor belt is allowed to pass through the first passage and the second passage to connect a vehicle without twisting when the anchor belt is located at the in-use position.

According to an embodiment of the present invention, a vehicle belt of the vehicle is allowed to pass through the first passage and the second passage without interfering with the anchor belt when the anchor belt is located at the stored position. The vehicle belt is laid on the first panel component and the second panel component instead of passing through the first through slot and the second through slot when the vehicle belt passes through the first passage and the second passage.

According to an embodiment of the present invention, the third panel component pivots to the closed position to tension the vehicle belt of the vehicle for removing slack from the vehicle belt in a condition that the vehicle belt of the vehicle passes through the first passage and the second passage.

In order to achieve the aforementioned objective, the present invention further discloses a child restraint system. The child restraint system includes a child restraint carrier and a child restraint base. The child restraint base is detachably installed with the restraint carrier. The child restraint base includes a base body, a first panel component, a second panel component, an anchor belt and a third panel component. The base body is for mounting the child restraint carrier. The first panel component is disposed on the base body. A first through slot is formed between the first panel component and the base body. The second panel component is disposed on the base body and spaced apart from the first panel component. A second through slot is formed between the second panel component and the base body. The anchor belt passes through the first through slot and the second through slot and is slidable between an in-use position and a stored position. The third panel component is disposed between the first panel component and the second panel component and pivotable between an opened position and a closed position, the third panel component pivots to the closed position to tension the anchor belt to remove slack from the anchor belt.

In summary, the present invention utilizes the first panel component, the second panel component and the base body to form the first through slot and the second through slot where the anchor belt, i.e., a latch belt, slidably passes through. When it is desired to use the anchor belt to secure the child restraint base onto the vehicle, the third panel component can be operated to pivot to the opened position, and the anchor belt can slide to the in-use position and pass through the first passage and the second passage to connect with the vehicle by the first anchor and the second anchor. Afterwards, the third panel component can be operated to pivot from the opened position to the closed position to tension the anchor belt for removing the slack from the anchor belt, which achieves the purpose of securing the child restraint base onto the vehicle to prevent movement of the child restraint base relative to the vehicle. When it is desired to use the vehicle belt to secure the child restraint base onto the vehicle, the third panel component can be operated to pivot to the opened position, and the anchor belt can slide to the stored position for allowing the vehicle belt to pass the first passage and the second passage without interfering with the anchor belt. When the vehicle belt passes through the first passage and the second passage, the vehicle belt is laid on the first panel component and the second panel component instead of passing through the first through slot and the second through slot. After the vehicle belt passing through the first passage and the second passage is buckled, the third panel component can be operated to pivot from the opened position to the closed position to tension the vehicle belt for removing the slack from the vehicle belt, which achieves the purpose of securing the child restraint base onto the vehicle to prevent movement of the child restraint base relative to the vehicle. Therefore, the present invention has an advantage of easy operation.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention maybe practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
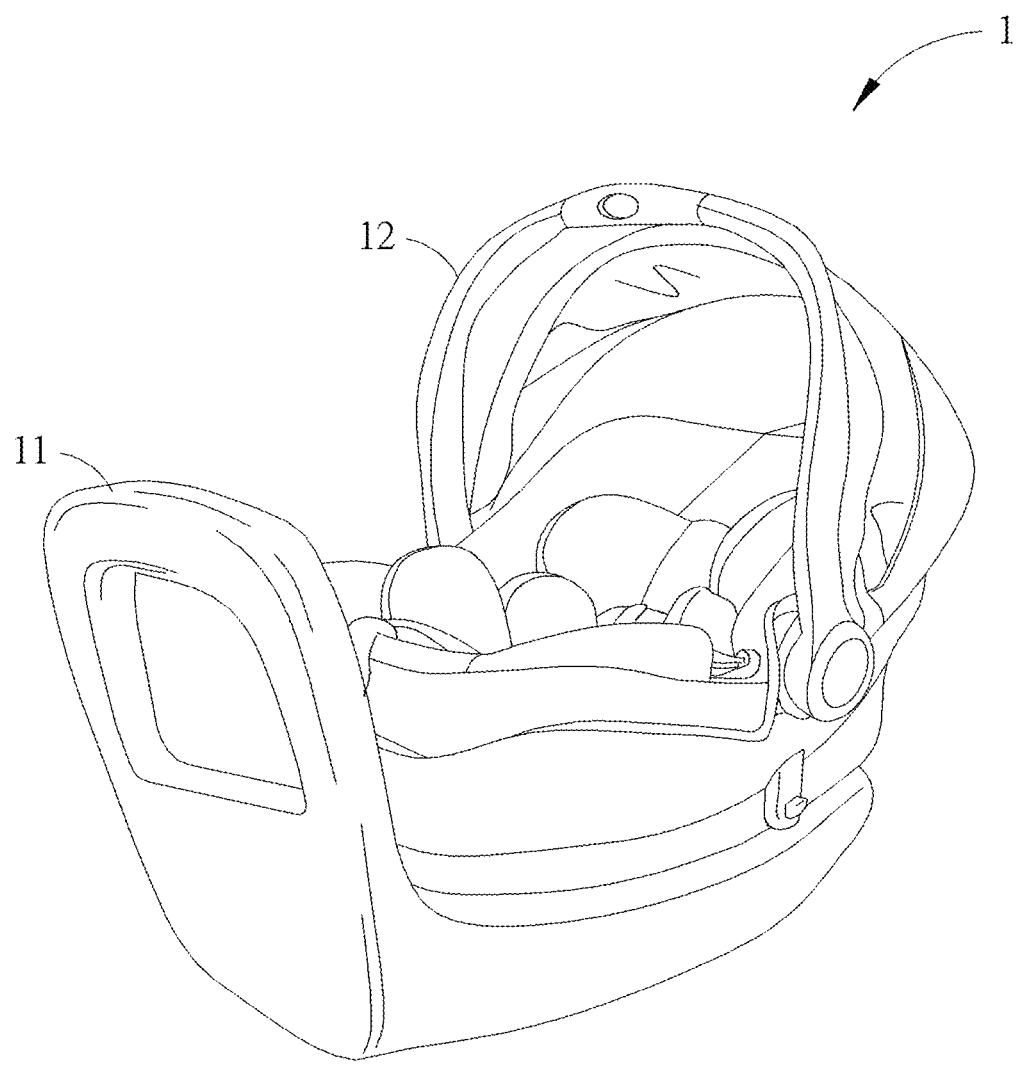
FIG. 1 is a schematic diagram of a child restraint system according to an embodiment of the present invention.

Please refer to FIG. 1. FIG. 1 is a schematic diagram of a child restraint system 1 according to an embodiment of the present invention. As shown in FIG. 1, the child restraint system 1 includes a child restraint base 11 and a child restraint carrier 12. The child restraint carrier 12 can be a carriage basket for providing safe and comfort to a child sitting therein. The child restraint carrier 12 is detachably installed on the child restraint base 11. The child restraint base 11 is secured onto a vehicle, which is not shown in the figure, so as to restrain a movement of the child restraint base 11 or the child restraint system 1 during a vehicle accident for achieving a purpose of effectively preventing injury or death of the child. However, the child restraint carrier is not limited to this embodiment. For example, in another embodiment, the child restraint carrier also can be a child car seat detachably installed on the child restraint base.

Figure 2:
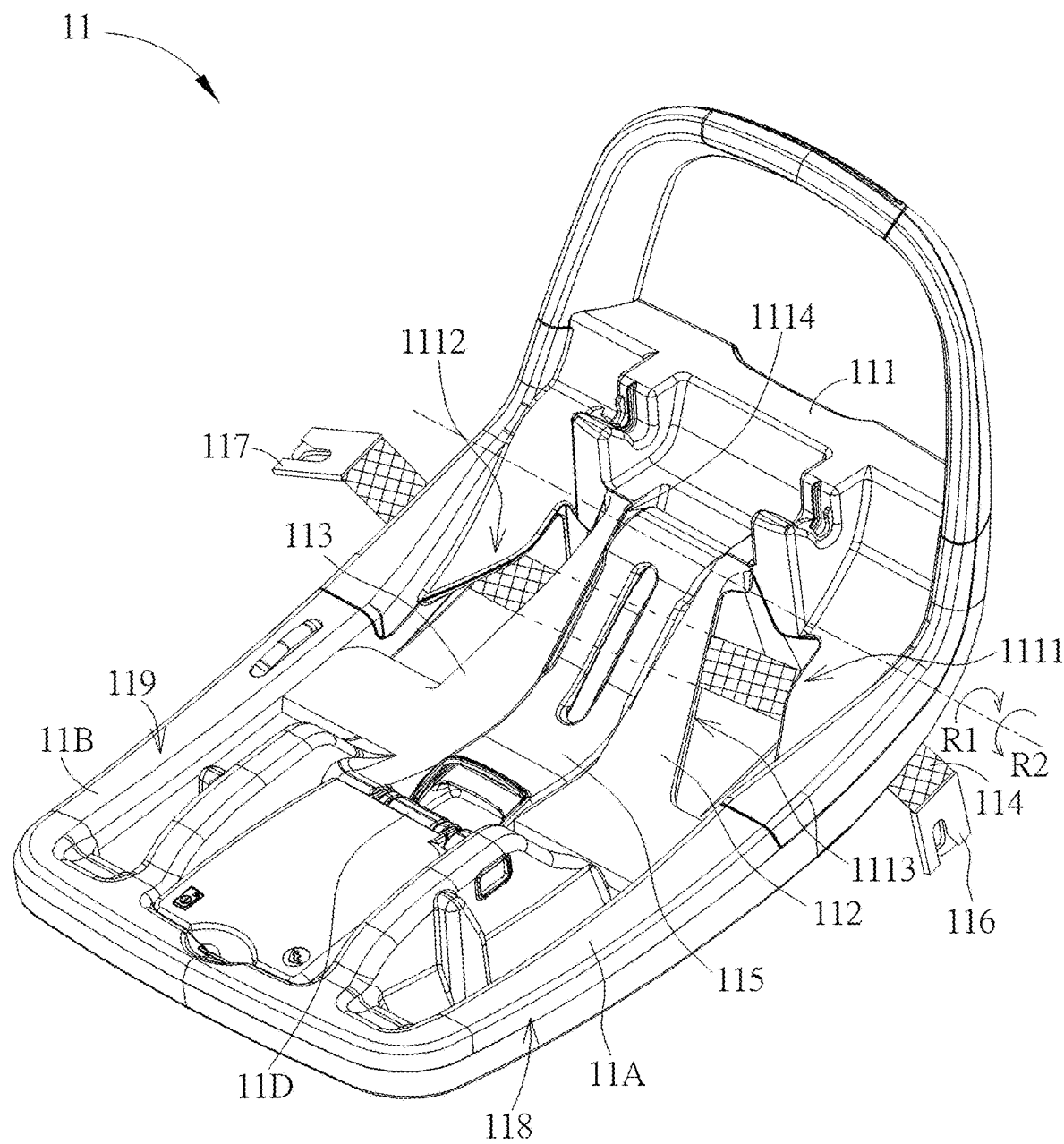
FIG. 2 is a diagram of a child restraint base as an anchor belt is at an in-use position according to the embodiment of the present invention.
Figure 3:
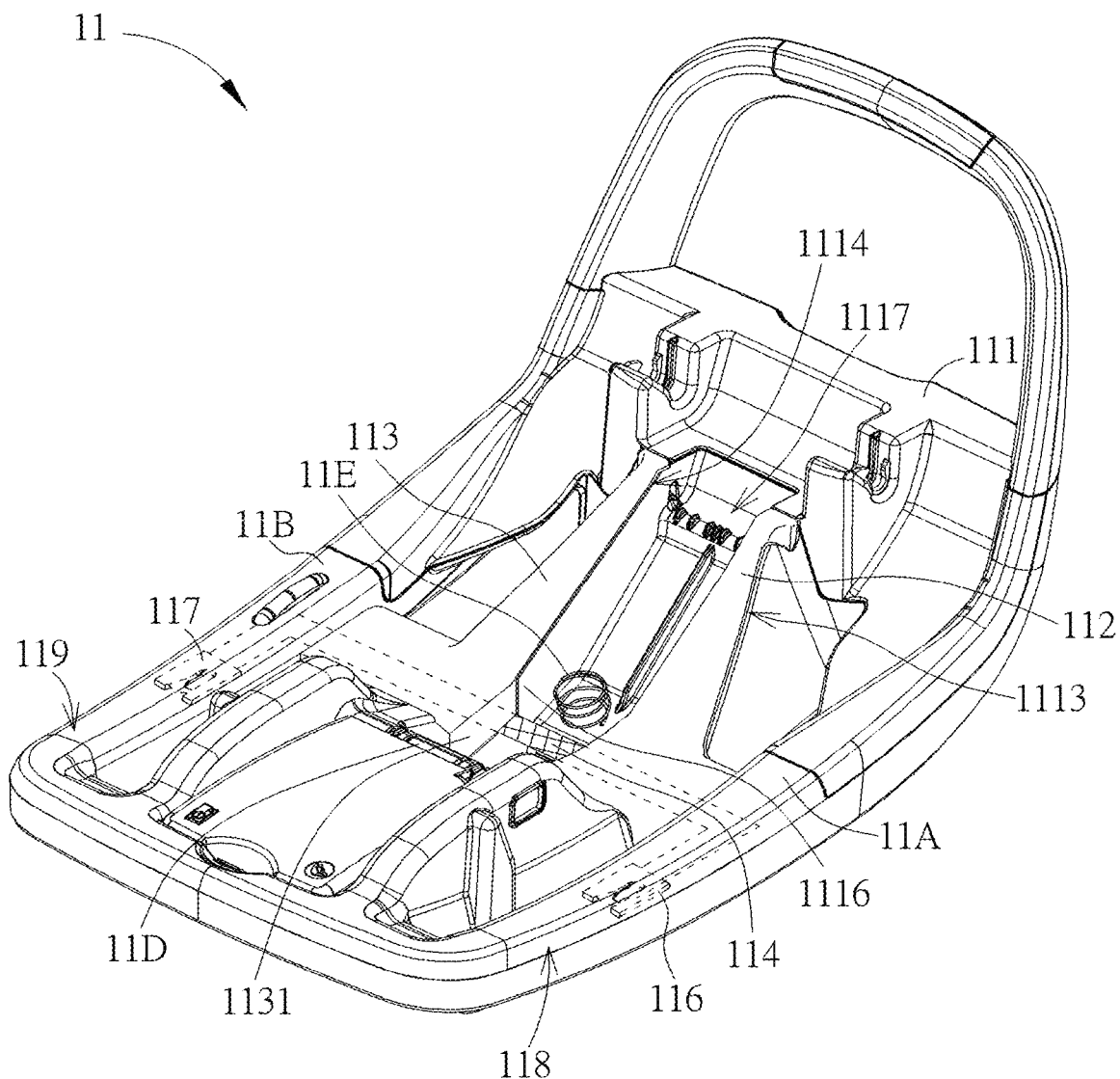
FIG. 3 is a partial diagram of the child restraint base as the anchor belt is at a stored position according to the embodiment of the present invention.
Figure 4:
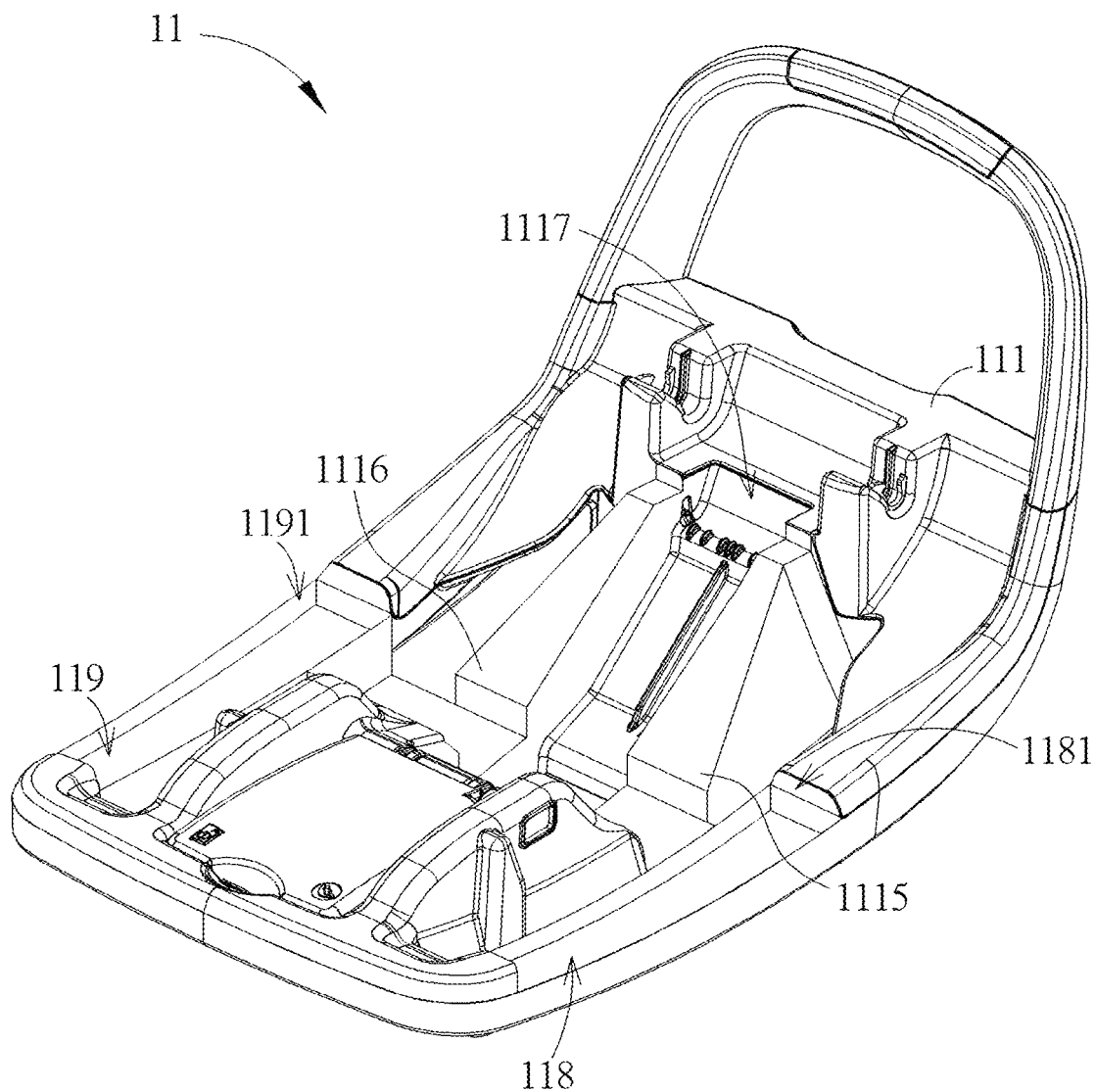
FIG. 4 is another partial diagram of the child restraint base according to the embodiment of the present invention.
Figure 5:
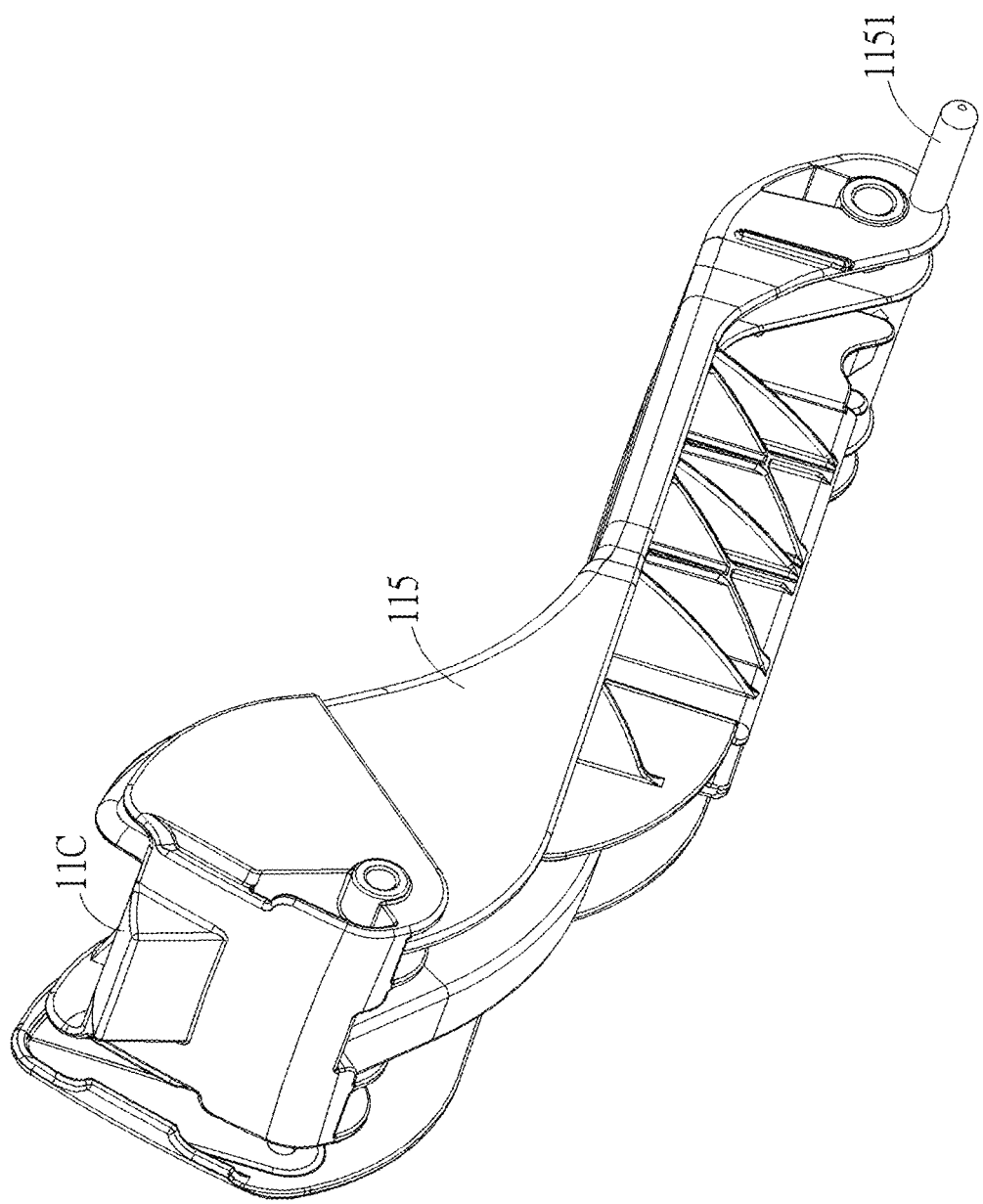
FIG. 5 is a diagram of a third panel component according to the embodiment of the present invention.

Please refer to FIG. 2 to FIG. 5. FIG. 2 is a diagram of the child restraint base 11 as an anchor belt 114 is at an in-use position according to the embodiment of the present invention. FIG. 3 is a partial diagram of the child restraint base 11 as the anchor belt 114 is at a stored position according to the embodiment of the present invention. FIG. 4 is another partial diagram of the child restraint base 11 according to the embodiment of the present invention. FIG. 5 is a diagram of a third panel component 115 according to the embodiment of the present invention. As shown in FIG. 2 to FIG. 4, the child restraint base 11 includes a base body 111, a first panel component 112, a second panel component 113, the anchor belt 114, the third panel component 115, a first anchor 116, a second anchor 117, a first pocket 118, a second pocket 119, a first cover 11A and a second cover 11B. The base body 111 is for mounting the child restraint carrier 12. A first passage 1111 and a second passage 1112 are formed on two rear lateral sides of the base body 111 for allowing the anchor belt 114 or a vehicle belt of the vehicle to pass therethrough. The first panel component 112 is disposed on the base body 111. A first through slot 1113 is formed between the first panel component 112 and the base body 111. The second panel component 113 is disposed on the base body 111 and spaced apart from the first panel component 112. A second through slot 1114 is formed between the second panel component 113 and the base body 111.

The anchor belt 114 passes through the first through slot 1113 and the second through slot 1114 and is slidable between the in-use position and the stored position along the first through slot 1113 and the second through slot 1114. The third panel component 115 is pivotally disposed between the first panel component 112 and the second panel component 113 and pivotable between an opened position and a closed position relative to the base body 111 for removing slack from the anchor belt 114 or the vehicle belt. The first anchor 116 and the second anchor 117 are connected to two ends of the anchor belt 114 and for connecting with the vehicle. The first pocket 118 and the second pocket 119 are located on an outer perimeter of the base body 111 and located at two front lateral sides of the base body 111. The first pocket 118 is for receiving the first anchor 116 when the anchor belt 114 is moved to the stored position and has a first top opening 1181 for easy access. The second pocket 119 is for receiving the second anchor 117 when the anchor belt 114 is moved to the stored position and has a second top opening 1191 for easy access. The first cover 11A is pivotally connected to the base body 111 and for covering the first top opening 1181. The second cover 11B is pivotally connected to the base body 111 and for covering the second top opening 1191.

Specifically, a first step-shaped structure 1115 and a second step-shaped structure 1116 are formed on the base body 111. A protruding length of a lower portion of the first step-shaped structure 1115 is less than a protruding length of an upper portion of the first step-shaped structure 1115. The protruding length of the first step-shaped structure 1115 can be decreased from the upper portion of the first step-shaped structure 1115 to the lower portion of the first step-shaped structure 1115 gradually. A protruding length of a lower portion of the second step-shaped structure 1116 is lower than a protruding length of an upper portion of the second step-shaped structure 1116. The protruding length of the second step-shaped structure 1116 can be decreased from the upper portion of the second step-shaped structure 1116 to the lower portion of the second step-shaped structure 1116 gradually. The first step-shaped structure 1115 and the second step-shaped structure 1116 are respectively covered by the first panel component 112 and the second panel component 113. The first through slot 1113 is formed between the first step-shaped structure 1115 and the first panel component 112, and the second through slot 1114 is formed between the second step-shaped structure 1116 and the second panel component 113. Furthermore, a first inner protruding rib, which is not shown in the figures, protrudes from the first panel component 112 downwardly and located at a position corresponding to the lower portion of the first step-shaped structure, and a second inner protruding rib 1131 protrudes from the second panel component 113 downwardly and located at a position corresponding to the lower portion of the second step-shaped structure 1116. The first inner protruding rib and the second inner protruding rib 1131 guide the anchor belt 114 downwardly and away from the third panel component 115 when the anchor belt 114 moves from the in-use position toward the stored position. In other words, the anchor belt 14 at the stored position is not tensioned by the third panel component 115 by such configuration.

Besides, a recess 1117 is formed on the base body 111 and located between the first step-shaped structure 1115 and the second step-shaped structure 1116 for receiving the third panel component 115 when the third panel component 115 is located at the closed position, and the third panel component 115 drives the anchor belt 114 to partially enter into the recess 1117 to tension the anchor belt 114 or the vehicle belt for removing the slack from the anchor belt 114 or the vehicle belt when the third panel component 115 pivots toward the closed position. The child restraint base 11 further includes a first engaging component 11C and a second engaging component 11D. The first engaging component 11C is disposed on the third panel component 115. The second engaging component 11D is disposed on the base body 111. The first engaging component 11C engages with the second engaging component 11D for preventing the third panel component 115 from leaving from the closed position when the third panel component 115 is located at the closed position. Preferably, the child restraint base 11 further includes a resilient component 11E installed between the third panel component 115 and the base body 111 for biasing the third panel component 115 to move toward the opened position.

As shown in FIG. 2, when it is desired to use the anchor belt 114 to secure the child restraint base 11 onto the vehicle, the third panel component 115 can be operated to pivot to the opened position along a first rotating direction R1 around a pivoting shaft 1151 of the third panel component 115, and the anchor belt 114 can slide to the in-use position and pass through the first passage 1111 and the second passage 1112 to connect with the vehicle by the first anchor 116 and the second anchor 117. Afterwards, the third panel component 115 can be operated to pivot from the opened position to the closed position along a second rotating direction R2 opposite to the first rotating direction R1 around the pivoting shaft 1151 of the third panel component 115 to tension the anchor belt 114 for removing the slack from the anchor belt 114, which achieves a purpose of securing the child restraint base 11 onto the vehicle to prevent movement of the child restraint base 11 relative to the vehicle.

Figure 6:
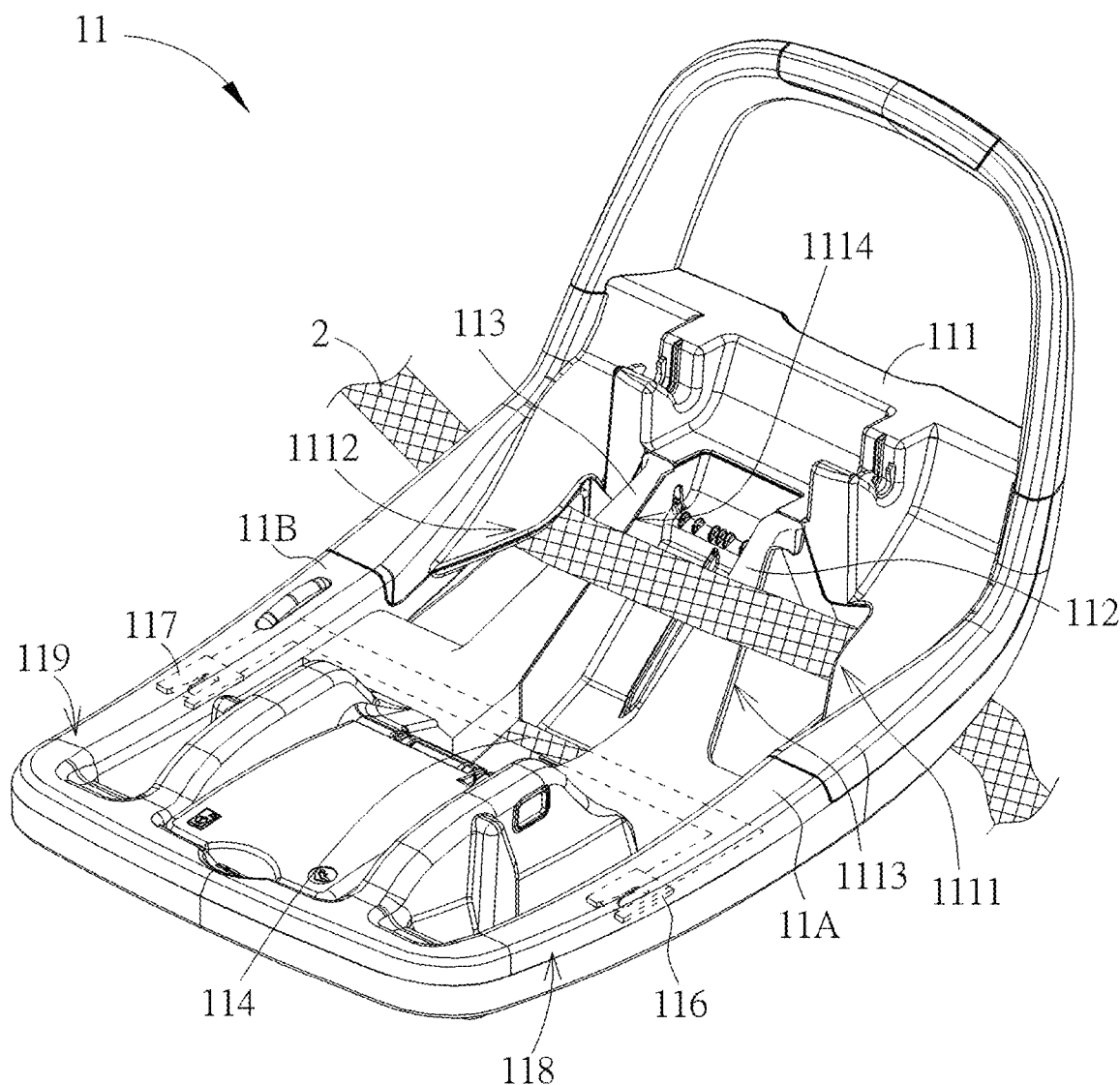
FIG. 6 is a partial diagram of the child restraint base as a vehicle belt is tensioned by a third panel component according to the embodiment of the present invention.

Please refer to FIG. 3 and FIG. 6. FIG. 6 is a partial diagram of the child restraint base 11 as a vehicle belt 2 is tensioned by the third panel component 115 according to the embodiment of the present invention. As shown in FIG. 3 and FIG. 5, when it is desired to use the vehicle belt 2 to secure the child restraint base 11 onto the vehicle, the third panel component 115 can be operated to pivot to the opened position along the first rotating direction R1 around the pivoting shaft 1151 of the third panel component 115. Afterwards, the anchor belt 114 can slide to the stored position along the first through slot 1113 and the second through slot 1114, and the first anchor 116 and the second anchor 117 can be respectively received inside the first pocket 118 and the second pocket 119. When the anchor belt 114 is at the stored position, the anchor belt 114 is far away and located below a belt path of the vehicle belt, which allows the vehicle belt 2 to pass the first passage 1111 and the second passage 1112 without interfering with the anchor belt 114. When the vehicle belt 2 passes through the first passage 1111 and the second passage 1112, the vehicle belt 2 is laid on the first panel component 112 and the second panel component 113 instead of passing through the first through slot 1113 and the second through slot 1114. After the vehicle belt 2 passes through the first passage 1111 and the second passage 1112, the third panel component 115 can be operated to pivot from the opened position to the closed position along the second rotating direction R2 around the pivoting shaft 1151 of the third panel component 115 to tension the vehicle belt 2 for removing the slack from the vehicle belt 2, which achieves the purpose of securing the child restraint base 11 onto the vehicle to prevent movement of the child restraint base 11 relative to the vehicle.

In contrast to the prior art, the present invention utilizes the first panel component, the second panel component and the base body to form the first through slot and the second through slot where the anchor belt, i.e., a latch belt, slidably passes through. When it is desired to use the anchor belt to secure the child restraint base onto the vehicle, the third panel component can be operated to pivot to the opened position, and the anchor belt can slide to the in-use position and pass through the first passage and the second passage to connect with the vehicle by the first anchor and the second anchor. Afterwards, the third panel component can be operated to pivot from the opened position to the closed position to tension the anchor belt for removing the slack from the anchor belt, which achieves the purpose of securing the child restraint base onto the vehicle to prevent movement of the child restraint base relative to the vehicle. When it is desired to use the vehicle belt to secure the child restraint base onto the vehicle, the third panel component can be operated to pivot to the opened position, and the anchor belt can slide to the stored position for allowing the vehicle belt to pass the first passage and the second passage without interfering with the anchor belt. When the vehicle belt passes through the first passage and the second passage, the vehicle belt is laid on the first panel component and the second panel component instead of passing through the first through slot 1113 and the second through slot 1114. After the vehicle belt passing through the first passage and the second passage is buckled, the third panel component can be operated to pivot from the opened position to the closed position to tension the vehicle belt for removing the slack from the vehicle belt, which achieves the purpose of securing the child restraint base onto the vehicle to prevent movement of the child restraint base relative to the vehicle. Therefore, the present invention has an advantage of easy operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child restraint base adapted to a child restraint carrier, the child restraint base comprising:
   a base body for mounting the child restraint carrier, the base body including a first pocket and a second pocket, the first pocket and the second pocket being disposed on opposed lateral sides of the base body;
   a first panel disposed on the base body, a first through slot being formed between the first panel and the base body;
   a second panel disposed on the base body and spaced apart from the first panel, a second through slot being formed between the second panel and the base body;
   an anchor belt passing through the first through slot and the second through slot, a first anchor attached to a first end of the anchor belt, and a second anchor attached to a second end of the anchor belt, wherein the first pocket is configured to receive at least a portion of the first anchor, and the second pocket is configured to receive at least a portion of the second anchor; and
   a third panel disposed between the first panel and the second panel and pivotable between an opened position and a closed position, the third panel pivoting to the closed position to tension the anchor belt to remove slack from the anchor belt.

2. The child restraint base of claim 1, wherein a portion of each of the first pocket and the second pocket is partially formed by a surface located on an outer perimeter of the base body.

3. The child restraint base of claim 1, further comprising a first inclined structure and a second inclined structure formed on the base body, a protruding length of a lower portion of the first inclined structure is lower than a protruding length of an upper portion of the first inclined structure, a protruding length of a lower portion of the second inclined structure is lower than a protruding length of an upper portion of the second inclined structure, each of the first inclined structure and the second inclined structure are at least partially covered by the first panel and the second panel, respectively.

4. The child restraint base of claim 1, further comprising a recess formed on the base body for receiving the third panel when the third panel is located at the closed position, and the third panel drives the anchor belt to partially enter into the recess to tension the anchor belt for removing the slack from the anchor belt when the third panel pivots toward the closed position.

5. The child restraint base of claim 1, further comprising a first engaging component and a second engaging component, the first engaging component being disposed on the third panel, the second engaging component being disposed on the base body, and the first engaging component engaging with the second engaging component for preventing the third panel from leaving from the closed position when the third panel is located at the closed position.

6. The child restraint base of claim 5, further comprising a resilient component installed between the third panel and the base body for biasing the third panel to move toward the opened position.

7. The child restraint base of claim 1, further comprising a first passage and a second passage formed on the opposed lateral sides of the base body, wherein the anchor belt is allowed to pass through the first passage and the second passage and is configured to connect to a vehicle without twisting of the anchor belt when the anchor belt is in an in-use position.

8. The child restraint base of claim 7, wherein the first passage and the second passage are each configured to receive a vehicle belt without interfering with the anchor belt and an outer surface of the first panel and an outer surface of the second panel are each configured to support the vehicle belt when the anchor belt is in a stored position.

9. The child restraint base of claim 8, wherein the third panel pivots to the closed position to tension the vehicle belt of the vehicle for removing slack from the vehicle belt in a condition that the vehicle belt of the vehicle passes through the first passage and the second passage.

10. A child restraint system comprising:
    a child restraint carrier; and
    a child restraint base detachably installed with the child restraint carrier, the child restraint base comprising:
       a base body for mounting the child restraint carrier, the base body including a first pocket and a second pocket, the first pocket and the second pocket being disposed on opposed lateral sides of the base body;

a first panel disposed on the base body, a first through slot being formed between the first panel and the base body;

a second panel disposed on the base body and spaced apart from the first panel, a second through slot being formed between the second panel and the base body;

an anchor belt passing through the first through slot and the second through slot, a first anchor attached to a first end of the anchor belt, and a second anchor attached to a second end of the anchor belt, wherein the first pocket is configured to receive at least a portion of the first anchor and the second pocket is configured to receive at least a portion of the second anchor; and a third panel disposed between the first panel and the second panel and pivotable between an opened position and a closed position, the third panel pivoting to the closed position to tension the anchor belt to remove slack from the anchor belt.

11. The child restraint system of claim 10, wherein a portion of each of the first pocket and the second pocket is partially formed by a surface located on an outer perimeter of the base body.

12. The child restraint system of claim 10, further comprising a first inclined structure and a second inclined structure formed on the base body, a protruding length of a lower portion of the first inclined structure is lower than a protruding length of an upper portion of the first inclined structure, a protruding length of a lower portion of the second inclined structure is lower than a protruding length of an upper portion of the second inclined structure, each of the first inclined structure and the second inclined structure are at least partially covered by the first panel and the second panel, respectively.

13. The child restraint system of claim 10, further comprising a recess formed on the base body and for receiving the third panel when the third panel is located at the closed position, and the third panel drives the anchor belt to partially enter into the recess to tension the anchor belt for removing the slack from the anchor belt when the third panel pivots toward the closed position.

14. The child restraint system of claim 10, wherein the child restraint base further comprises a first engaging component and a second engaging component, the first engaging component is disposed on the third panel, the second engaging component is disposed on the base body, and the first engaging component engages with the second engaging component for preventing the third panel from leaving from the closed position when the third panel is located at the closed position.

15. The child restraint system of claim 14, wherein the child restraint base further comprises a resilient component installed between the third panel and the base body for biasing the third panel to move toward the opened position.

16. The child restraint system of claim 10, further comprising a first passage and a second passage formed on the opposed lateral sides of the base body, wherein the anchor belt is allowed to pass through the first passage and the second passage and is configured to connect to a vehicle without twisting of the anchor belt when the anchor belt is in an in-use position.

17. The child restraint system of claim 16, wherein the first passage and the second passage are each configured to receive a vehicle belt without interfering with the anchor belt and an outer surface of the first panel and an outer surface of the second panel are each configured to support the vehicle belt when the anchor belt is in a stored position.

18. The child restraint system of claim 17, wherein the third panel pivots to the closed position to tension the vehicle belt of the vehicle for removing slack from the vehicle belt in a condition that the vehicle belt of the vehicle passes through the first passage and the second passage.

19. A child restraint base adapted to a child restraint carrier, the child restraint base comprising:

a base body for mounting the child restraint carrier, the base body including a first inclined structure and a second inclined structure, each of the first inclined structure and the second inclined structure having an upper portion and a lower portion, and the first inclined structure and the second inclined structure are laterally spaced relative to each other, the base body defining a recess having a perimeter that is at least partially defined between:
(i) the upper portions of the first inclined structure and the second inclined structure, and
(ii) the lower portions of the first inclined structure and the second inclined structure;

a panel pivotable between an opened position and a closed position, the panel having a pivot shaft at a pivoting end positioned between the upper portions of the first inclined structure and the second inclined structure, the panel configured to pivot to the closed position to tension at least one belt to remove slack from the at least one belt, and a free end of the panel opposite from the pivoting end is at least partially received within the recess as the panel pivots from the opened position to the closed position; and the perimeter of the recess is defined by a first side surface, a second side surface, and a lateral surface extending between the first side surface and the second side surface, and the free end of the panel abuts the lateral surface of the recess when the panel is configured to pivot to the closed position.

20. The child restraint base of claim 19, wherein the panel is configured to be rotated towards a front portion of the base body to transition from the opened position to the closed position.

21. The child restraint base of claim 19, wherein each of the first inclined structure and the second inclined structure have a varying height that gradually increases from the lower portion to the upper portion.

22. The child restraint base of claim 19, wherein the at least one belt comprises a vehicle belt and an anchor belt, wherein the anchor belt is configured to be stored in a stored position that is located away and below a belt path of the vehicle belt along the base body.

23. The child restraint base of claim 22, wherein the anchor belt extends at least partially through the base body.

24. The child restraint base of claim 19, further comprising a first pocket and a second pocket, the first pocket and the second pocket being disposed on opposed lateral sides of the base body.

25. The child restraint base of claim 19, wherein the perimeter of the recess is partially defined by a medial region of the base body that is defined in a forward direction relative to the first inclined structure and the second inclined structure.

26. The child restraint base of claim 25, wherein the perimeter of the recess is defined in the medial region of the base body via a first side surface, a second side surface, and a lateral surface extending between the first side surface and the second side surface.

27. The child restraint base of claim 26, further comprising an engaging portion configured to retain the panel in the closed position, and the engaging portion is disposed adjacent to the lateral surface.

28. The child restraint base of claim 25, wherein the medial region of the base body defines an upper surface, and the recess is partially defined below the upper surface of the base body.

29. The child restraint base of claim 19, wherein at least a majority of the panel is retained within the recess when the panel is in the closed position.

30. The child restraint base of claim 19, wherein the panel and the recess have complementary profiles.

31. The child restraint base of claim 19, wherein the perimeter of the recess is partially defined by a medial region of the base body disposed in front of the lower portions of the first inclined structure and the second inclined structure.

32. The child restraint base of claim 19, wherein the panel is configured to directly contact the at least one belt in the closed position.

33. A child restraint base adapted to a child restraint carrier, the child restraint base comprising:
- a base body for mounting the child restraint carrier, the base body including a first inclined structure and a second inclined structure, each of the first inclined structure and the second inclined structure having an upper portion, and the first inclined structure and the second inclined structure are laterally spaced relative to each other, the base body defining a recess having a perimeter that is at least partially defined between the upper portions of the first inclined structure and the second inclined structure;
- a panel pivotable between an opened position and a closed position, the panel having a pivot shaft at a pivoting end positioned between the upper portions of the first inclined structure and the second inclined structure, the panel configured to pivot to the closed position to tension at least one belt to remove slack from the at least one belt, and a free end of the panel opposite from the pivoting end is at least partially received within the recess as the panel pivots from the opened position to the closed position; and
- the perimeter of the recess is defined by a first side surface, a second side surface, and a lateral surface extending between the first side surface and the second side surface, and the free end of the panel abuts the lateral surface of the recess when the panel is configured to pivot to the closed position.

34. The child restraint base of claim 33, further comprising a first pocket and a second pocket, the first pocket and the second pocket being disposed on opposed lateral sides of the base body.

35. The child restraint base of claim 33, wherein the panel is configured to be rotated towards a front portion of the base body to transition from the opened position to the closed position.

36. The child restraint base of claim 33, wherein each of the first inclined structure and the second inclined structure have a varying height that gradually increases toward the upper portion.

37. The child restraint base of claim 33, wherein the perimeter of the recess is partially defined by a medial region of the base body that is defined in a forward direction relative to the first inclined structure and the second inclined structure.

38. The child restraint base of claim 37, wherein the perimeter of the recess is defined in the medial region of the base body via a first side surface, a second side surface, and a lateral surface extending between the first side surface and the second side surface.

39. The child restraint base of claim 38, further comprising an engaging portion configured to retain the panel in the closed position, and the engaging portion is disposed adjacent to the lateral surface.

40. The child restraint base of claim 37, wherein the medial region of the base body defines an upper surface, and the recess is partially defined below the upper surface of the base body.

41. The child restraint base of claim 33, wherein at least a majority of the panel is retained within the recess when the panel is in the closed position.

42. The child restraint base of claim 33, wherein the panel and the recess have complementary profiles.

43. The child restraint base of claim 33, wherein the perimeter of the recess is partially defined by a medial region of the base body disposed in front of a lower portion of the first inclined structure and the second inclined structure.

44. The child restraint base of claim 33, wherein the panel is configured to directly contact the at least one belt in the closed position.

45. The child restraint base of claim 33, wherein the at least one belt comprises a vehicle belt and an anchor belt, wherein the anchor belt is configured to be stored in a stored position that is located away and below a belt path of the vehicle belt along the base body.

46. The child restraint base of claim 45, wherein the anchor belt extends at least partially through the base body.

* * * * *